H. S. HAWKINS.
ACCUMULATOR CELL AND METHOD OF MAKING THE SAME.
APPLICATION FILED MAY 2, 1917.
1,246,595.
Patented Nov. 13, 1917.
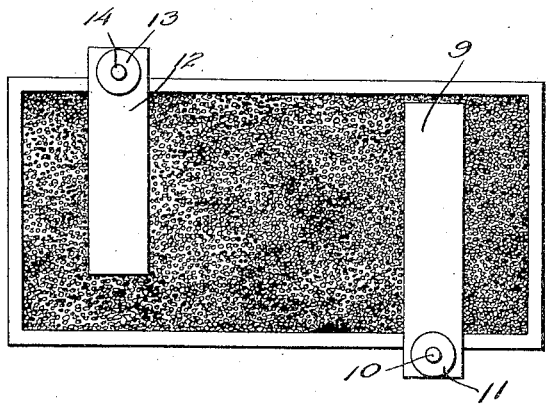
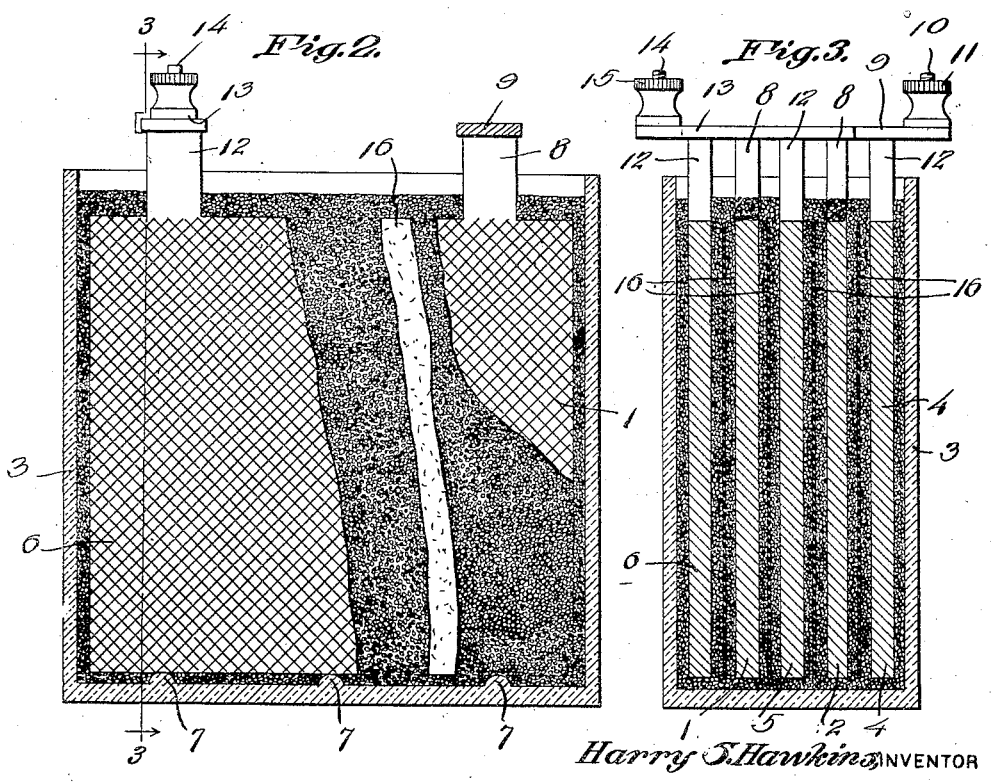
Harry S. Hawkins, INVENTOR
WITNESSES
BY
ATTORNEY

UNITED STATES PATENT OFFICE.

HARRY S. HAWKINS, OF ALTURAS, CALIFORNIA, ASSIGNOR OF ONE-HALF TO LEE WILSON, OF CEDARVILLE, CALIFORNIA.

ACCUMULATOR-CELL AND METHOD OF MAKING THE SAME.

1,246,595.  Specification of Letters Patent.  Patented Nov. 13, 1917.

Application filed May 2, 1917. Serial No. 165,972.

*To all whom it may concern:*

Be it known that I, HARRY S. HAWKINS, a citizen of the United States, residing at Alturas, in the county of Modoc and State of California, have invented certain new and useful Improvements in Accumulator-Cells and Methods of Making the Same, of which the following is a specification.

This invention relates to accumulator or storage battery cells, and more particularly to a cell employing plates of the Fauré or pasted type.

One of the main objects of the invention is to provide a cell of the character stated of simple and durable construction having a maximum of efficiency in which the weight is reduced to a minimum.

A further object is to provide a cell in which the plates or electrodes are securely braced mechanically, the pressing medium also acting to effectually eliminate all possibilities of "sluffing off" or disintegration of the active material of the plates.

A further object is to provide a cell in which the bracing material is highly porous so as to permit proper contact of the electrolyte with the active material of the plates, this bracing medium extending between and about the plates so as to firmly secure the same in proper relative positions mechanically and also serving to effectually prevent short circuiting of the plates by "tree growths" or the collection of sediment in the bottom of the cell.

A still further object is to provide a cell in which the usual sediment chamber may be entirely dispensed with.

Further objects will appear from the detailed description.

In the drawings:—

Figure 1 is a top plan view of a cell constructed in accordance with my invention, Fig. 2 is a longitudinal sectional view showing the interior construction of the cell, and Fig. 3 is a section taken substantially on line 3—3 of Fig. 2.

In constructing my cell, I mount the positive plates 1 and 2 in the container 3, these positive plates being alternated with the negative plates 4, 5, and 6. The plates are all mounted in parallel spaced relation, and are held spaced from the bottom of the container 3 by the transverse ribs 7 formed integral with the container. The plates which are employed in this cell are, preferably, of the pasted type, being formed in the usual manner from grids into which the active material or litharge paste is pressed.

Each of the positive plates 1 and 2 is provided adjacent one end, with an upwardly extending connecting lug 8 which is secured to a connecting bar 9 having the threaded stud 10 and thumb nut 11. The negative plates are similarly connected by lugs 12 to a bar 13 having the stud 14 and nut 15.

In constructing my cell, the plates are mounted in the container 1 in parallel spaced relation, being spaced approximately one-eighth of an inch apart, a slight space being left between the two outer plates and the sides of the container, a similar space being left between the ends of the plates and the container. After the cell has been assembled in the manner stated, I place an insert 16 of paper or very thin wood between the plates, as in Fig. 3 of the drawings. I then place in the spaces between and about the plates a sufficient quantity of granulated sugar to approximately one-fourth fill these spaces, care being taken to get an equal amount of this sugar at each side of the inserts 16.

After the cell has been assembled in this manner, I place it in an oven and bake the cell at a temperature of from 380° to 410° Fahrenheit for from 3 to 6 hours, depending to a large extent upon the amount of moisture contained in the sugar. During the baking operation, the sugar is completely fused and ebullition takes place so as to cause a boiling or bubbling of the sugar. This sugar, when thus melted, rises in the container and flows about and over the plates so as to completely surround the same. This baking operation results in completely carbonizing the sugar so as to produce a highly porous carbon which I term sponge carbon. This carbon adheres very closely to the surfaces of the plates so as to grip the same tightly mechanically, thus firmly securing the active material in the grids and rendering it impossible for "sluffing off" or disintegration of this material to take place. The inserts 16 act as reinforcing members to further strengthen the structure thus produced, these members being also completely carbonized during the baking operation. It is not always necessary to use the reinforcing inserts, though I prefer to do so under ordinary conditions as they further strengthen the structure produced and also serve to provide a relatively dense stratum of carbon between adjacent plates which materially assist in preventing washing of the plates. Where the container to be used is of hard rubber or other material which would be damaged by being placed in the baking oven, I place the assembled plates, together with the saccharine carbo-hydrate to be carbonized in a suitable paper covering which may be mounted in a glass container, this covering and the plates being removed from the glass container after the baking operation, as a unit, after which the paper may be stripped from the outer surfaces of the cell unit which may then be placed in its permanent container.

The structure produced by this process is practically monolithic, the plates all being firmly cemented by the sponge carbon so as to be firmly united mechanically. This carbon bracing medium is highly porous and readily permits the electrolyte, which is preferably a solution of sulfuric acid, to come into intimate contact with the active material of the plates. This carbon sponge is also an effective insulator due to its highly porous construction, and for this reason, all danger of short circuiting of the battery through the carbon reinforcing medium is eliminated. While permitting very intimate contact of the electrolyte with the active material of the plates, the sponge carbon serves to effectually prevent all washing of the plates due to tilting or movement of the container. The carbon also acts to eliminate all possibility of short circuiting of the cell by the formation of tree-growths between adjacent plates. As it is impossible for "sluffing off" or disintegration of the active material of the plates to take place, I eliminate entirely all necessity of providing the usual sediment chamber thus materially increasing the plate area in a cell for a given capacity, and completely eliminating all danger of short circuiting of the cell due to the collection of this sediment between the plates.

The carbon insulating and bracing material which completely surrounds the plates, serves to firmly brace the same so as to effectually prevent buckling, and materially strengthen the plates thus rendering it possible to use plates or electrodes which are much thinner than those heretofore used. As is well known, approximately 85% of the energy generated by a cell of this type is produced by the active material which extends inward about one-thirty-second of an inch from the surface of the plate, due to the fact that the electrolyte does not come into intimate contact with the material at a greater depth. To produce a perfect cell of this type, theoretically, the plates should be approximately one-sixteenth of an inch in thickness thus permitting a layer of active material on each side of the plate one-thirty-second of an inch in depth. In practice, it has been impossible to do this heretofore due to the fact that a plate as thin as this does not have sufficient mechanical strength, the thinnest plate now in practical use being approximately one-eighth of an inch in thickness. Due to the fact that the carbon sponge securely supports and braces the plates in my cell, I am enabled to utilize very thin plates, of one-sixteenth of an ich or less in thickness. By doing this, I reduce the weight of the cell approximately 40% as compared with a cell in which the plates now in use are employed. By this construction, I obtain a maximum efficiency and reduce weight to a minimum, the cell thus produced being well adapted for traction purposes due to its high production of energy as compared with its weight and the elimination of the usual sediment chamber thus providing a relatively large plate area for a cell of given capacity.

The carbon sponge which constitutes the spacing medium, in addition to effectually uniting and bracing the plates and preventing the disintegration or "sluffing off" of the active material, is an electrical insulator due to its highly porous construction, as above pointed out, and is also absolutely inert to the electrolyte employed which is, preferably, a sulfuric acid solution though any other electrolyte may be employed which is a simple acid solution. This sponge carbon separating medium is very porous and possesses great mechanical strength, and I have ascertained by actual use, will last considerably longer than the ordinary wood inserts commonly employed in cells of this type between the electrodes. For this reason, and due also to the complete elimination of disintegration of the active material, the cell which I thus produce has a very long life and will last, as nearly as I have been able to ascertain from experiments thus far conducted, approximately 3 times as long as the standard cell of the pasted type now in common use.

While I have described my cell as being of the Faure or pasted type, I have also found that it is very well adapted for use in connection with cells of the Planté type, or any other type of accumulator cell, in which it is always desirable to use relatively thin plates and prevent disintegration or "sluffing off" of the active material. Also, any other sugar carbo-hydrate may be employed in place of ordinary granulated cane or beet sugar though I usually employ this material as it is easily obtained and handled.

What I claim is:—

1. In electric cells, a plurality of electrode plates mounted in spaced relation, and a porous rigid insulating medium interposed between said plates and closely adhering to the same, so as to brace and support the plates.

2. In electric cells, a plurality of plates mounted in spaced relation, and a porous, substantially integral, rigid, bracing and reinforcing medium consisting of a carbonized sugar extending about and between said plates so as to maintain the same in proper relation.

3. In electric cells, a container, a plurality of electrode plates mounted therein in spaced relation, and a highly porous carbonaceous material placed between and about said plates and adhering closely to the same so as to brace and support the plates and prevent disintegration thereof.

4. In electric cells, a container, a plurality of electrode plates mounted in the container in spaced relation, and a substantially integral rigid porous insulating material inserted between and about said plates and adhering closely to the same so as to brace and support the plates and prevent disintegration thereof, said material being inert to acid.

5. In electric cells, a container, a plurality of electrode plates mounted in the container in spaced relation, and a highly porous carbonaceous insulating and bracing material formed by baking at a relatively high temperature a sugar placed between and about the said plates, said material being in close contact with and adhering closely to the plates so as to brace the same and prevent disintegration of said plates.

6. A method for making electric cells consisting in supporting a plurality of electrode plates in spaced relation, partially filling the spaces between and about the plates with a sugar, and then baking this sugar at a sufficiently high temperature to cause ebullition thereof and produce a highly porous carbon which adheres closely to said plates.

7. In electric cells, a container, a plurality of electrode plates mounted in the container in spaced relation, a highly porous carbonaceous insulating and bracing material formed by baking at a relatively high temperature a sugar placed between and about the said plates, said material being in close contact with and adhering closely to the plates so as to brace the same and prevent disintegration of said plates, and carbonized relatively dense reinforcing members embedded in said insulating material and interposed between said plates.

In testimony whereof I affix my signature in presence of two witnesses.

HARRY S. HAWKINS.

Witnesses:
    ALICE HAWKINS,
    JNO. P. CALLAGHAN.